United States Patent [19]
Nett

[11] Patent Number: 4,730,866
[45] Date of Patent: Mar. 15, 1988

[54] PICKUP BED TONNEAU COVER MOUNTING

[76] Inventor: James A. Nett, P.O. Box 825, Norman, Okla. 73070

[21] Appl. No.: 28,357

[22] Filed: Mar. 20, 1987

[51] Int. Cl.4 ............................................. B60J 7/10
[52] U.S. Cl. .................................................. 296/100
[58] Field of Search ................................. 296/100, 98

[56] References Cited

U.S. PATENT DOCUMENTS

| | | | |
|---|---|---|---|
| 4,273,377 | 6/1981 | Alexandar | 296/100 |
| 4,607,876 | 8/1986 | Reed | 296/100 |
| 4,639,033 | 1/1987 | Wheatley et al. | 296/100 |
| 4,647,103 | 3/1987 | Walslay | 296/100 |

Primary Examiner—Robert R. Song
Attorney, Agent, or Firm—Robert K. Rhea

[57] ABSTRACT

A device for releasably attaching the marginal edges of a flexible cover to the end and sidewalls of a pickup truck bed includes a bar and channel clamp member depending adjacent the pickup bed inner sidewall flange and supporting elongated rails on the upper limit of the respective end and sidewall. The rails being provided with opposing lateral coextensive slots receiving fastening members securing the clamp members and cover thereto in a manner which fulcrums the clamp members against the sidewalls inner surface to assist in maintaining the cover taut.

7 Claims, 8 Drawing Figures

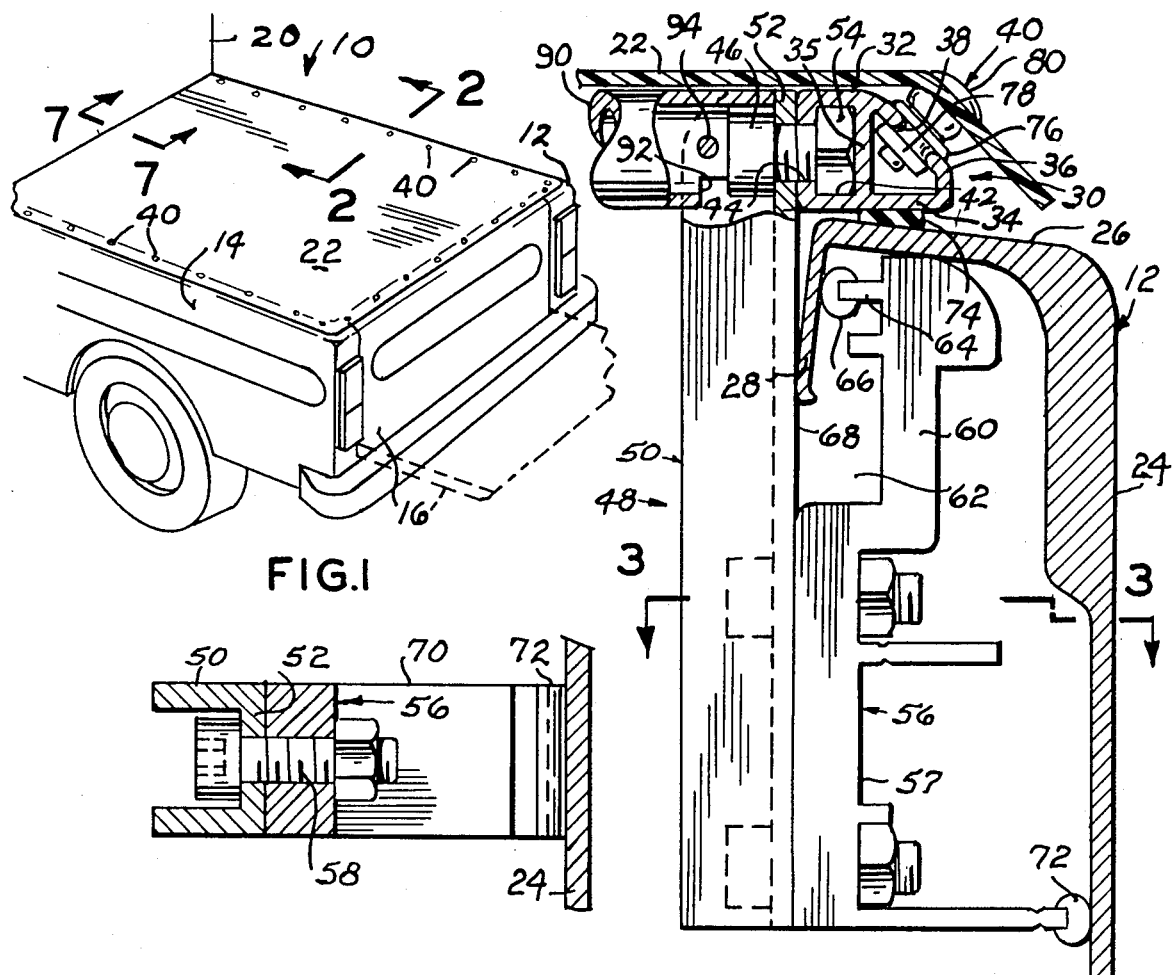
FIG. 1
FIG. 3
FIG. 2
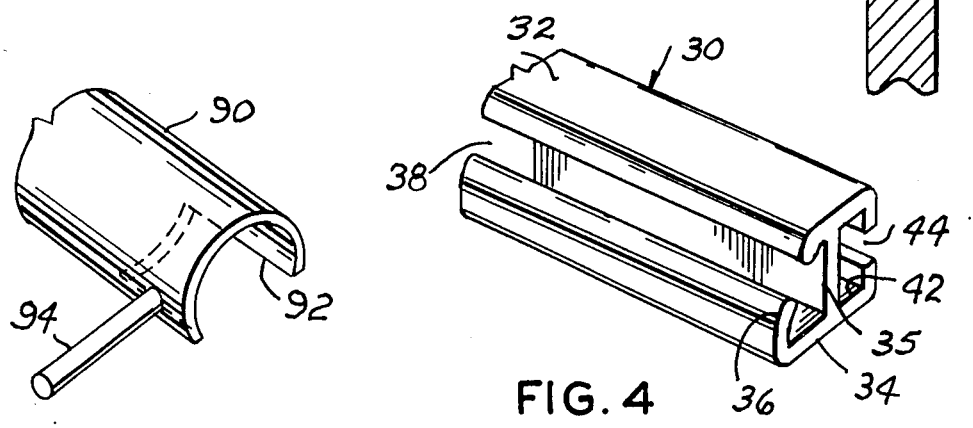
FIG. 8
FIG. 4

PICKUP BED TONNEAU COVER MOUNTING

BACKGROUND OF THE INVENTION

1. Field of the Invention.

The present invention relates to pickup bed covers and more particularly to a pickup bed sidewall attached mount for securing a tonneau cover rail to the pickup bed.

A tonneau cover is frequently mounted on pickup beds to shield contents therein from view, sunshine or inclement weather. Further, such covers tend to increase the miles per gallon of gasolene burned.

This invention provides a pickup bed sidewall rail member easily fastened by snap fasteners to the perimeter of a tonneau cover.

2. Description of the Prior Art.

Heretofor in providing pickup bed sidewalls with fasteners it has been general practice to fasten one section of fasteners to the pickup bed sidewall and end gate by drilling holes therein. This increases the cost of installation and does not accommodate the shrink and/or expanding characteristics of the cover frequently resulting in the cover either being too loose and thereby collecting water or snow in the central portion of the cover.

The most pertinent prior patent is believed to be U.S. Pat. No. 4,639,033 which discloses connecting a right angular rail in overlying relation to the pickup sidewall by a clamp member impinging a portion of the rail to a pickup sidewall flange. A C-shaped hook, coextensive with and secured to the tonneau cover marginal edges, resiliently engages the lateral edge or lip of the cover supporting rail projecting over the pickup sidewalls and tailgate.

This invention is distinctive over this patent by a sidewall member supporting a cover mounting rail on the top of the pickup bed sidewalls and which has end members extending between the sidewall rails adjacent the pickup cab and across the tailgate. The rail support, resiliently engages the pickup bed sidewalls and allows sufficient variation between the sidewall rail mounted position and forward to rearward spacing of the transverse rails to accommodate weather induced variations in the transverse and longitudinal dimensions of the tonneau cover.

SUMMARY OF THE INVENTION

An elongated extruded metallic rail, substantially right triangular in transverse section, defines opposing laterally open slots when coextensively overlying a pickup bed sidewall. The outer or lateral slot opening outwardly with respect to the pickup bed longitudinally slidably receives a plurality of the base portion of snap fasteners which cooperate with companion top portions of the snap fasteners secured in selected spaced relation to the marginal edge portions of a tonneau cover so that the respective marginal edge of the cover is inclined downward and outwardly with respect to the interior of the pickup bed. The opposite or inwardly open rail slot cooperatively receives slidably the nut of a bolt fastener projecting through the top end portion of a clamp channel member depending from the inner side of the rail adjacent the inner depending flange of a pickup sidewall. A clamp bar, secured to the depending end portion of the channel, resiliently grips the pickup bed sidewall flange and abuts the depending surface of the pickup sidewall horizontal top portion. Identical tonneau cover supporting rails extend between the sidewall rail ends and are removably connected thereto at the forward and rearward limit of the pickup bed.

The principal object of this invention is to provide a tonneau cover fastening rail system for the sidewalls and respective ends of a pickup truck bed which may be easily connected therewith without drilling or modifying the pickup sidewalls or end gate and which compensates for minor variations in the transverse and longitudinal dimensions of a tonneau cover during the several seasons of the year.

BRIEF DESCRIPTION OF THE DRAWINGS

FIG. 1 is a fragmentary perspective view of the pickup truck bed with the apparatus supporting a tonneau cover;

FIG. 2 is a fragmentary vertical cross sectional view, to a larger scale, taken substantially along the line 2—2 of FIG. 1;

FIG. 3 is a horizontal sectional view taken substantially along the line 3—3 of FIG. 2;

FIG. 4 is a fragmentary perspective view of the sidewall overlying cover supporting rail;

DESCRIPTION OF THE PREFERRED EMBODIMENTS

Figure 5:
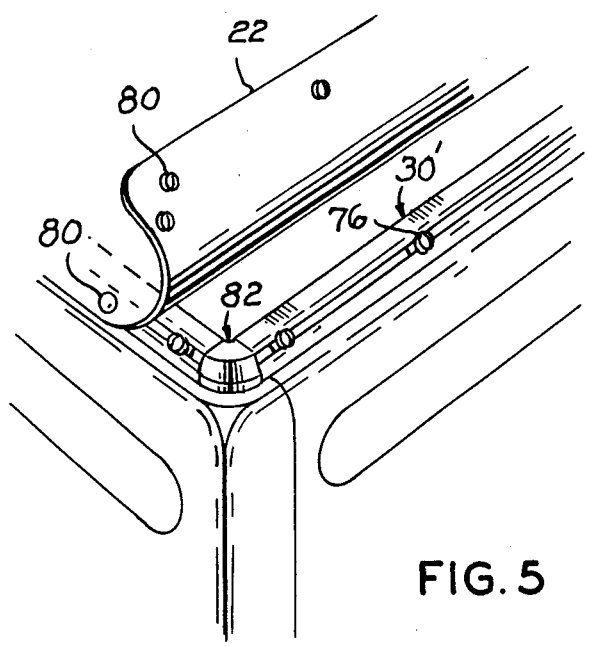
FIG. 5 is a fragmentary perspective view illustrating a cover support rail overlying the pickup bed, end gate and connected with the rearward end portion of the respective cover supporting side rail.

Like characters of reference designate like parts in those figures of the drawings in which they occur.

Figure 7:
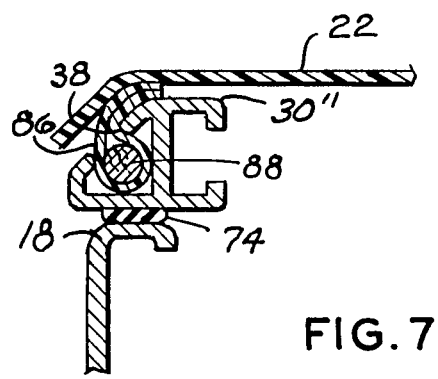
FIG. 7 is a fragmentary vertical cross sectional view taken substantially along the line 7—7 of FIG. 1; and, FIG. 8 is a fragmentary perspective view of one end of a cover supporting transverse rod.

In the drawings:

The reference numeral 10 indicates the pickup bed of a pickup truck having sidewalls 12 and 14 spanned at their rearward ends by an end gate or tailgate 16 extending between the sidewalls 12 and 14. The forward limit of the pickup bed and its sidewalls is defined by a forward wall 18 (FIG. 7) adjacent the rearward limit of the pickup cab 20. A cover 22, usually formed from plastic material, overlies at its perimeter edge portions and is secured to the pickup bed sidewalls, end gate and forward wall in the manner to be presently explained.

Referring more particularly to FIG. 2, the sidewall 12 is substantially typical of pickup truck bed sidewalls presently in use, usually formed from sheet material with an upright or vertical portion 24 substantially normal to the front of the pickup bed, not shown, and is turned inwardly in a generally horizontal plane, as at 26, and terminates at its inward limit in a downturned sidewall flange portion 28 angularly inclined downwardly laterally inward of the vertical portion 24 of the sidewall.

An elongated metallic extrusion forms a rail 30 generally triangular shaped in end elevation longitudinally overlies the pickup sidewall generally horizontal top surface 26 adjacent its inward limit. The rail 30 is characterized by a horizontal top wall 32 parallel with a base wall 34 and interconnected by a web 35 intermediate their widths. A lateral edge portion of the top being angularly turned downwardly at substantially 45° to confront in spaced relation a similar upwardly turned extension 36 of the base to define an outwardly facing coextensive rail slot 38 for slidably receiving snap fasteners 40 as presently explained.

The other or laterally inward limit of the rail top wall 32 and its base 34 are respectively turned downwardly and upwardly laterally of the web 35 to define a rectangular bolt nut receiving slot 42 and a coextensive laterally inward facing slot 44 for admitting the shank of a bolt 46 for the purpose presently explained.

Clamp means 48 resiliently grips the sidewall flange 28 and supports the rail 30 on the upper surface of the sidewall. The clamp means 48 comprises a U-shaped channel 50 having a length substantially greater than the vertical height of the sidewall flange 28. The bight 52 of the channel 50 is apertured at its upper end for receiving the bolt 46 with its nut 54 disposed in the rail slot 42. A companion bar clamp member 56, substantially Z-shaped in side elevation and equidistant with that portion of the channel 50 depending from the sidewall 12, is rigidly connected by one leg of the Z-shape to the depending end portion of the channel by a pair of bolts and nuts 58. The other end or leg portion 60 of the bar clamp 56 terminates adjacent the bottom surface of the sidewall top portion 26 and in parallel spaced relation with the upper end portion of the channel 50 for forming a slot or throat 62 transversely loosely receiving an intermediate portion of the sidewall flange 28.

Adjacent its upper end, the bar clamp end portion 60 is provided with a horizontal flange 64 projecting toward the interior surface of the sidewall flange 28. A section of resilient material forming a bumper 66 is interposed between the flange 64 and sidewall flange 28. A thin strip of synthetic material, such as plastic 68, is bonded to the surface of the channel bight portion 52 in contact with the sidewall flange 28 to prevent damaging the finish of the latter.

A horizontal bottom flange or arm 70 extends from the depending end of the bar clamp 56 toward the inner wall surface of the sidewall 12 and supports a resilient bumper 72 similar to the bumper 66. Similarly, a length of resilient padding 74 is interposed between the rail 30 and the sidewall surface 26. The clamp means 48 and the rails 30 are thus resiliently supported on the respective pickup sidewall.

The two part snap fastener has its base 76 pop riveted to a snap fastener glide 78 longitudinally slidable in the rail slot 38. The cooperating snap top or button 80 of the respective snap fastener is secured in a conventional manner to the peripheral edge portion of the cover 22 in selected spaced relation so that when the fasteners are joined the cover is supported on the pickup bed. The spacing between the rails and the mounting of the companion portions of the snap rails on the cover being predetermined so that the cover may be manually pulled taut across the pickup bed and, when attached to the rails, biases or fulcrums the clamp means 48 about its channel bight contact with the pickup sidewall flange 28 and forcing the bumpers 66 and 72 into contact with the inner surfaces of the sidewall in cooperation with the bight portion of the channel 50.

Usually three or four of the clamp means 48, along the respective sidewalls 12 and 14 of the pickup bed, are sufficient to maintain the rails 30 thereon.

Figure 6:
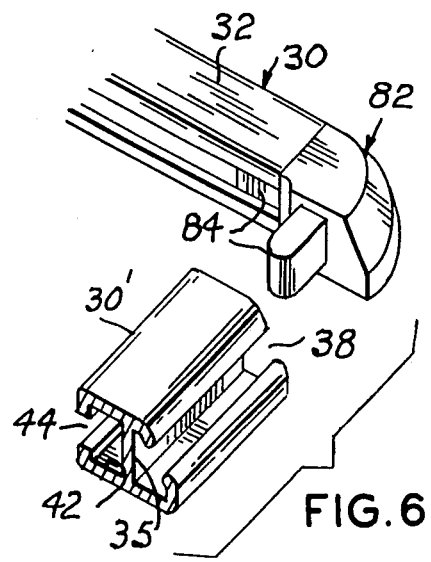
FIG. 6 is a fragmentary exploded perspective view, to a different scale, illustrating the manner of joining the adjacent ends of a pickup bed sidewall rail to one of the transverse end rails for the pickup bed.

A selected length of one of the rails 30, as indicated at 30', extends between the rearward end portions of the sidewall rails 30 in overlying relation with respect to the pickup end gate 16. The respective end portions of the rail 30 is supported by rail corner junctions 82 (FIGS. 5 and 6), each having a pair of rectangular in transverse section horizontal lugs 84 disposed in right angular relation and cooperatively received by the nut slot 42 in the end of the respective sidewall rail 30 and end gate rail 30'. The friction fit of the lugs 84 in the slots 42, in combination with the tension of the cover 22, maintains the end gate rail 30' in position and permits opening the end gate 16 while the cover remains in place. The rail 30' is preferably conventionally braced, not shown, to provide rigidity against bowing inward.

The forward end of the pickup bed is similarly provided with a transverse forward end rail 30" similarly connected to the sidewall rails 30 by other rail corner members 82. Since the forward rails are adjacent the rearward limit of the pickup cab 20, the forward end portion of the cover is connected to the rail 30" in the following manner. A loop 86, formed by doubling fabric material back upon itself and coextensive with the transverse width of the cover 22, is secured as by stitching it to the forward end portion of the cover 22. This loop 86 is then disposed in the snap slot 38 and an elongated dowel 88 (FIG. 7) is longitudinally inserted into the loop 86 while contained within the rail slot 38.

Obviously, the dowel may be inserted into the loop prior to inserting it into the rail slot and then the dowel and loop, as a unit, are longitudinally inserted in a sliding action into the rail.

Additionally, the central portion in smaller pickup beds and dual transverse positions of the cover is supported in standard pickup beds by an elongated rod 90 (FIGS. 2 and 8) extending between oppositely disposed rail supporting clamp members 48 by the respective end portion of the rod having a portion of its periphery removed, as at 92 (FIG. 8), and supported by the rail mounting bolt head 46. The respective end portion of the tube 90 is further transversely line drilled through the respective legs of the channel 50 for receiving a pin or bolt 94 to maintain the cover support rod 90 in place.

Obviously the invention is susceptible to changes or alterations without defeating its practicability. Therefore, I do not wish to be confined to the preferred embodiment shown in the drawings and described herein.

I claim:

1. A tonneau cover attachment for a pickup truck bed having a front end wall, a tail gate and opposing sidewalls, the sidewalls having a generally horizontal top surface terminating laterally inward in a depending flange transversely not greater than the transverse width of the horizontal top surface, comprising:

a flexible cover having a top and bottom surfaces and having marginal side and end edges adapted to fit over the corresponding side and end limits of a pickup truck bed;

elongated rail means, coextensive with and substantially flatly overlying each sidewall top surface, including web connected parallel vertically spaced horizontal base and top walls and lateral rail sides respectively having coextensive opposing inner and outer laterally open slots;

elongated fulcrum clamp means secured at its upper end portion in depending relation to the rail laterally inward side and having an upwardly open throat loosely receiving the sidewall depending flange, the clamp means having a lateral arm extending outwardly from a lower end portion of the clamp means and abutting the inward surface of the pickup sidewall; and, means for releasably fastening the cover to the rail outer slot.

2. The cover attachment according to claim 1 in which the fastening means includes:

a two-part snap fastener having one part fixed to the marginal edge of the cover and the other part longitudinally adjustable slidably in the rail outer slot.

3. The cover attachment according to claim 1 in which the fastening means includes:

a loop formed from fabric material doubled back upon itself and stitched coextensively to marginal edge portions of said cover, said loop adapted to project laterally into the rail outer slot; and an elongated rod-like member having a diameter greater than the transverse width of the rail outer slot disposed within that portion of the loop within the rail outer slot.

4. The cover attachment according to claim 1 and further including:

slip joint connector means joining adjacent end portions of two of said rails in right angular relation.

5. The cover attachment according to claim 1 in which the clamp means includes:

an elongated channel having a bight portion; and, screw threaded means connecting the channel bight to said rail.

6. The cover attachment according to claim 5 in which the clamp means further includes:

a bar having one leg end portion flatly contacting the outer bight surface of the depending end portion of said channel member and an opposite upper leg end portion disposed in parallel spaced relation with respect to the outer surface of the channel member upper end portion; and, other screw threaded means securing the channel to the bar.

7. The cover attachment according to claim 6 and further including:

an elongated cover supporting rod extending transversely of the pickup bed between the upper limit of oppositely disposed clamp members.

* * * * *